(12) United States Patent
Wilkerson et al.

(10) Patent No.: US 10,786,956 B2
(45) Date of Patent: Sep. 29, 2020

(54) DIE-BASED COMPOSITE FABRICATION

(71) Applicant: The Boeing Company, Chicago, IL (US)

(72) Inventors: Randall D. Wilkerson, O'Fallon, MO (US); Donald C. Besselsen, Lake St Louis, MO (US); Philip P. Steinacher, Carrollton, IL (US); Jerry Lee Newland, Warrenton, MO (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 15/498,438

(22) Filed: Apr. 26, 2017

(65) Prior Publication Data
US 2018/0311916 A1 Nov. 1, 2018

(51) Int. Cl.
| | | |
|---|---|---|
| B29C 70/52 | (2006.01) | |
| B29D 99/00 | (2010.01) | |
| B29C 43/28 | (2006.01) | |
| B29C 70/50 | (2006.01) | |
| B29K 105/06 | (2006.01) | |
| B29K 307/04 | (2006.01) | |
| B29C 43/52 | (2006.01) | |

(52) U.S. Cl.
CPC ............ B29C 70/526 (2013.01); B29C 43/28 (2013.01); B29C 70/50 (2013.01); B29C 70/521 (2013.01); B29D 99/0003 (2013.01); B29C 43/52 (2013.01); B29K 2105/06 (2013.01); B29K 2307/04 (2013.01)

(58) Field of Classification Search
CPC ..... B29C 70/526; B29C 70/521; B29C 70/50; B29C 43/28; B29C 43/52; B29D 99/0003; B29K 2105/06; B29K 2307/04

USPC ........................................................ 156/242
See application file for complete search history.

(56) References Cited

U.S. PATENT DOCUMENTS

| | | | |
|---|---|---|---|
| 4,559,005 A | 12/1985 | Gants et al. | |
| 4,992,299 A | 2/1991 | Hochberg et al. | |
| 7,807,005 B2 | 10/2010 | Rubin et al. | |
| 8,425,708 B2 | 4/2013 | Rubin et al. | |
| 8,491,745 B2 | 7/2013 | Wilkerson et al. | |
| 8,795,457 B2 | 8/2014 | Rubin et al. | |
| 9,415,577 B1 | 8/2016 | Sutkus et al. | |
| 2007/0175573 A1* | 8/2007 | Fox .......................... | B29C 70/34 156/196 |
| 2009/0050263 A1* | 2/2009 | Suzuki ................... | B29C 43/203 156/245 |
| 2011/0048624 A1 | 3/2011 | Nitsch | |
| 2011/0206906 A1 | 8/2011 | Rubin et al. | |

(Continued)

OTHER PUBLICATIONS

Ginger Gardiner; Aerospace-grade compression molding; Case study; 6/30/201.

(Continued)

*Primary Examiner* — Philip C Tucker
*Assistant Examiner* — Vicki Wu
(74) *Attorney, Agent, or Firm* — Duft & Bornsen, PC (57) ABSTRACT

Systems and methods are provided for forming composite parts. One embodiment is a method that includes receiving flat unidirectional tape that is continuous and fiber-reinforced, and drawing the tape through a fixed die that heats and plastically deforms the tape into a gap filler having a non-flat cross section.

20 Claims, 10 Drawing Sheets

(56) References Cited

U.S. PATENT DOCUMENTS

| | | | | |
|---|---|---|---|---|
| 2012/0196083 A1* | 8/2012 | Hanawa | ............... | B29C 70/50 |
| | | | | 428/130 |
| 2013/0186557 A1* | 7/2013 | Cramer | ............... | B29C 70/386 |
| | | | | 156/256 |
| 2014/0072758 A1* | 3/2014 | Arvidson | ............ | F41H 5/0485 |
| | | | | 428/114 |
| 2015/0099096 A1* | 4/2015 | Forston | ............... | B64C 1/12 |
| | | | | 428/162 |
| 2016/0257058 A1* | 9/2016 | Johnson | ............... | B29C 70/52 |

OTHER PUBLICATIONS

Pultrusion; Wikipedia.
European Search Report; Application EP18168952; dated Jan. 21, 2019.

* cited by examiner

DIE-BASED COMPOSITE FABRICATION

FIELD

The disclosure relates to the field of composite part fabrication.

BACKGROUND

Composite parts, such as Carbon Fiber Reinforced Polymer (CFRP) parts, are formed from multiple layers that are shaped into a laminate. Individual fibers within each layer of the laminate are aligned parallel with each other, but different layers may exhibit different fiber orientations in order to increase the strength of the resulting composite part along different dimensions.

Continuous Compression Molding (CCM) machines may be utilized to fabricate continuous-length thermoplastic composite parts having complex cross-sectional shapes (e.g., "I," "C," "H," etc.). When a CCM machine forms a thermoplastic composite part, it is not uncommon for the CCM machine to receive multiple laminates and apply bends to the laminates. The CCM machine may further apply heat, and press the laminates together to form a composite part. For example, long or continuous lengths of laminates may be fed through a pre-forming operation wherein the laminates are shaped into a continuous pre-form. The pre-form is then passed to a compression press that performs heating and consolidation. The consolidation operation includes iteratively operating dynamic dies which forces the plies together and consolidates the plies into a final shape. The dies then retract in order to enable the laminate to advance.

Because laminates comprise multiple layers and have a non-zero thickness, bends applied to laminates may result in gaps when laminates are consolidated, which results in reduced structural strength. Hence, designers of composite parts continue to seek out enhanced techniques for filling gaps in complex thermoplastic composite parts formed by CCM machines.

SUMMARY

Embodiments described herein provide for enhanced dies for fabrication of composite parts. CCM machines may integrate gap fillers created by these dies into CCM fabrication techniques for composite parts. Specifically, a drive mechanism of a CCM machine may be integrated with one or more heated dies that shape incoming fiber reinforced tape into a desired cross-sectional shape for a gap filler. Hence, operation of the CCM machine serves to pull laminates forward for shaping, and also pulls tape through the dies to facilitate pre-forming during CCM operations. This ensures that the gap fillers exhibit and maintain a desired shape both before and after pre-forming operations.

One embodiment is a method that includes receiving flat unidirectional tape that is continuous and fiber-reinforced, and drawing the tape through a fixed die that heats and plastically deforms the tape into a gap filler having a non-flat cross section.

A further embodiment is an apparatus. The apparatus includes a fixed reinforced thermoplastic material forming die. The die includes a body comprising a channel having a first cross section at an entrance and a second cross section at an exit that is smaller than the first cross section and a heater contacting the body, the heater comprising multiple heating elements that heat the body to a glass transition temperature for a reinforced thermoplastic material. A pulling mechanism downstream of the die draws the reinforced thermoplastic material through the die. A feeding device upstream of the die feeds the reinforced thermoplastic material into the entrance.

A further embodiment is a system that includes laminates that are continuous and fiber-reinforced, flat unidirectional tape that is continuous and fiber-reinforced, and a fixed die that receives the tape, heats the tape, and plastically deforms the tape into a gap filler having a non-flat cross-section.

A still further embodiment is a non-transitory computer readable medium embodying programmed instructions which, when executed by a processor, are operable for performing a method. The method includes receiving flat unidirectional tape that is continuous and fiber-reinforced, and drawing the tape through a fixed die that heats and plastically deforms the tape into a gap filler having a non-flat cross section.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
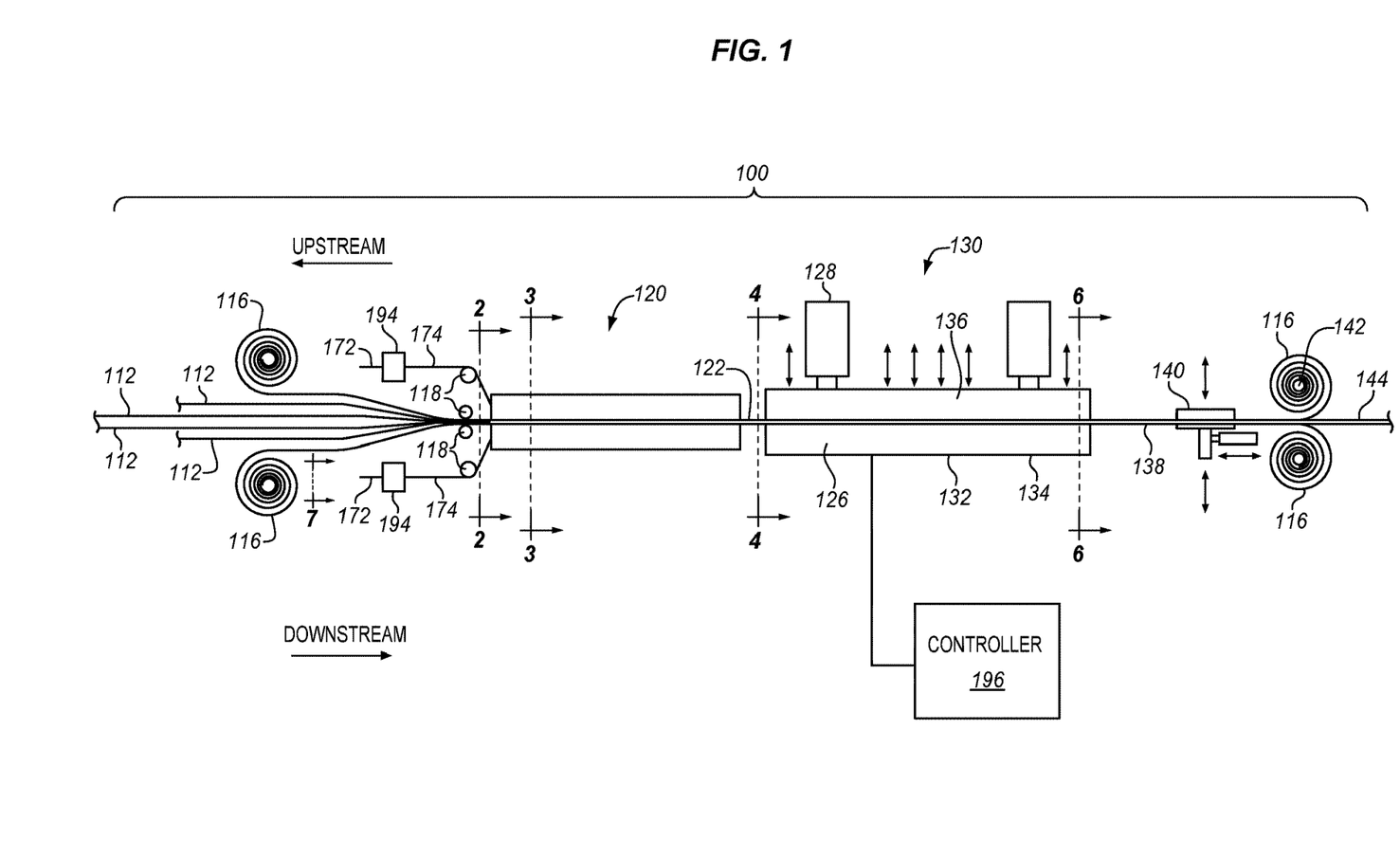
FIG. 1 is a block diagram of a CCM machine that includes fixed dies for forming gap fillers in an exemplary embodiment.

FIG. 1 is a block diagram of a CCM machine 100 that includes fixed dies 194 for forming gap fillers in an exemplary embodiment. In this embodiment, CCM machine 100 includes preformer 120 and consolidator 130. Plies 112 of fiber-reinforced material (e.g., Carbon Fiber Reinforced Polymer (CFRP)) may be supplied from continuous rolls (not shown) or sheets (not shown). Furthermore, release foils 116 are supplied to facilitate the shaping process. Plies 112 and release foils 116 are fed to preformer 120. Plies 112 that are part of the same laminate at preformer 120 are referred to as "laminates."

Gap fillers 174 are also illustrated in FIG. 1. Gap fillers 174 are shaped from tape 172 (e.g., a fiber reinforced unidirectional material) by travelling through fixed dies 194. Guides 118 facilitate entry of plies 112 and gap fillers 174 into preformer 120. In preformer 120, various shape features may be preformed via the application of pressure to plies 112 and gap fillers 174. Thus, tape 172 progresses through fixed dies 194 to become gap fillers 174 as part of a pultrusion process, and then is introduced into CCM processes that involve incremental shaping/forming.

Preformer 120 shapes plies 112 and gap filler 174 into a preformed laminate 122. Preformed laminate 122 has the general shape of composite part 138, but has not yet been consolidated. Preformed laminate 122 exits preformer 120 and moves into consolidator 130. Consolidator 130 includes a plurality of dynamic dies 136 (e.g., moving dies). Dynamic dies 136 shape preformed laminate 122 during consolidation.

Consolidator 130 further includes drive mechanism 140 (e.g., a pulsating drive mechanism, such as a set of periodically driven rollers, etc.) that moves preformed laminate 122 forward within consolidator 130 and away from preformer 120, in continuous, incremental steps. As preformed laminate 122 moves forward, the preformed laminate 122 first enters a heating zone 126 that heats preformed laminate 122 to a temperature which allows the free flow of the polymeric component of a curable resin in plies 112. For example, heating zone 126 may heat preformed laminate to a glass transition temperature of the resin, such as 700° Fahrenheit (F).

Next, preformed laminate 122 moves forward into a pressing zone 132 wherein dynamic dies 136 are brought down collectively or individually at predefined pressures sufficient to compress and consolidate (i.e., allow free-flow of matrix resin within) the various plies 112, resulting in a desired shape and thickness. Actuators 128 provide force that engages and withdraws dynamic dies 136. As dynamic dies 136 are opened, preformed laminate 122 is incrementally advanced within consolidator 130, following which dynamic dies 136 are closed again, causing successive portions of the preformed laminate 122 to be compressed within different temperature zones, and thereby consolidate plies 112 in the compressed section. This process is repeated for each temperature zone of dynamic dies 136 as preformed laminate 122 is incrementally advanced through consolidator 130.

The fully formed and compressed preformed laminate 122 then enters a cooling zone 134 which is separated from the pressing zone 132, wherein the temperature is brought below the free-flowing temperature of the curable resin in plies 112 thereby causing the fused and/or consolidated preformed laminate 122 to harden into a final shape. The consolidated and cooled composite part 138 then exits consolidator 130, where release foils 116 are taken up on rollers 142. The final composite part 144 is removed at the end of CCM machine 100.

Controller 196 manages the operations of CCM machine 100. For example, controller 196 may control timing and/or amounts of force applied by drive mechanism 140, preformer 120, actuators 128, and/or dynamic dies 136. By controlling drive mechanism 140, controller 196 manages pultrusion operations at fixed dies 194, as well as the speed of CCM operations. For example, controller 196 may control an amount of force in response to input from one or more tension sensors (not shown), and may time the operations of drive mechanism 140 to ensure that drive mechanism pulls while dynamic dies 136 are not engaged. Controller 196 may be implemented, for example, as custom circuitry, as a hardware processor executing programmed instructions, or some combination thereof.

Figure 2:
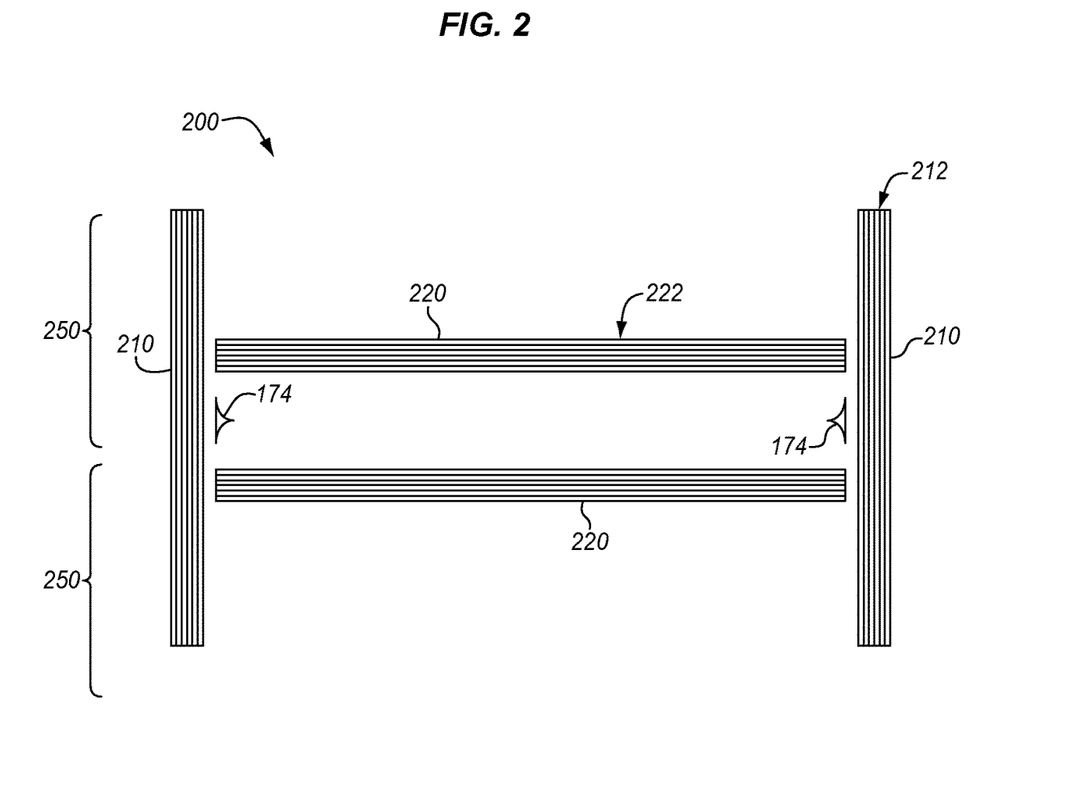
FIG. 2 is a front view of a cross-section of laminates about to be shaped by a CCM machine in an exemplary embodiment.

FIG. 2 is a front view of a cross-section of laminates about to be shaped by a CCM machine in an exemplary embodiment. Specifically, FIG. 2 corresponds with view arrows 2 of FIG. 1. FIG. 2 shows laminates prior to forming into an "I" beam 200 of back-to-back "C" channels 250, wherein gap fillers 174 are sandwiched between the C channels 250. FIG. 2 does not show release foils 116 As shown in FIG. 2, laminates 220 are horizontally oriented and each comprise multiple layers 222, while laminates 210 are vertically oriented and each comprise layers 212. Gap fillers 174 are also illustrated. Before entering preformer 120, laminates 210 and laminates 220 are planar.

Figure 3:
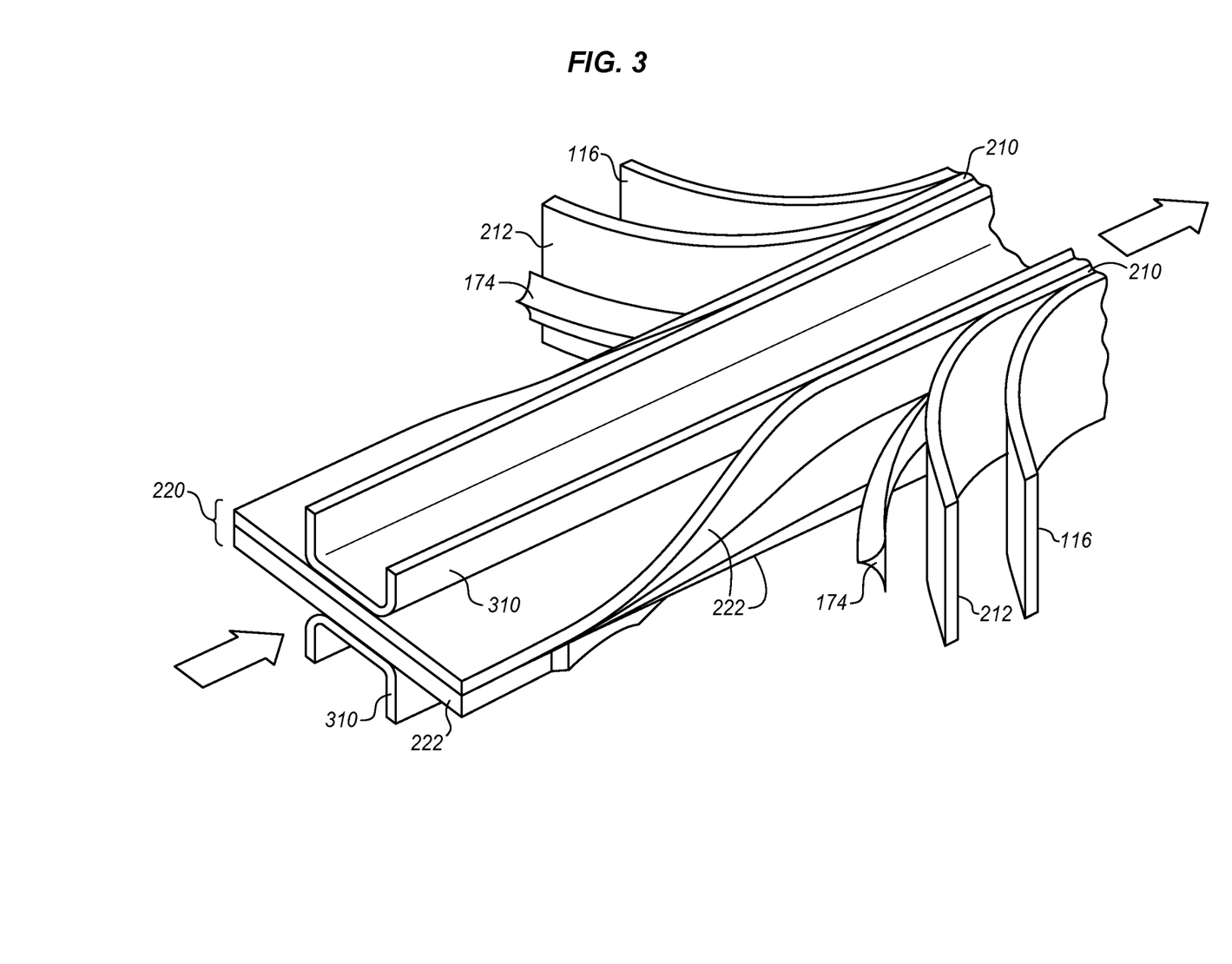
FIG. 3 is a perspective view of initial arrangement of laminates and gap fillers in an exemplary embodiment.

FIG. 3 is a perspective view of the shaping of laminates performed by preformer 120, and corresponds with view arrows 3 of FIG. 1. According to FIG. 3, layers 222 of laminates 220 are folded to form "C" channels, while layers 212 of laminates 210 are arranged to vertically couple laminates 220 together. C-shaped mandrels 310 are also illustrated. Gap fillers 174 are arranged to fit within gaps that would otherwise be formed by the bending of laminates 220.

Figure 4:
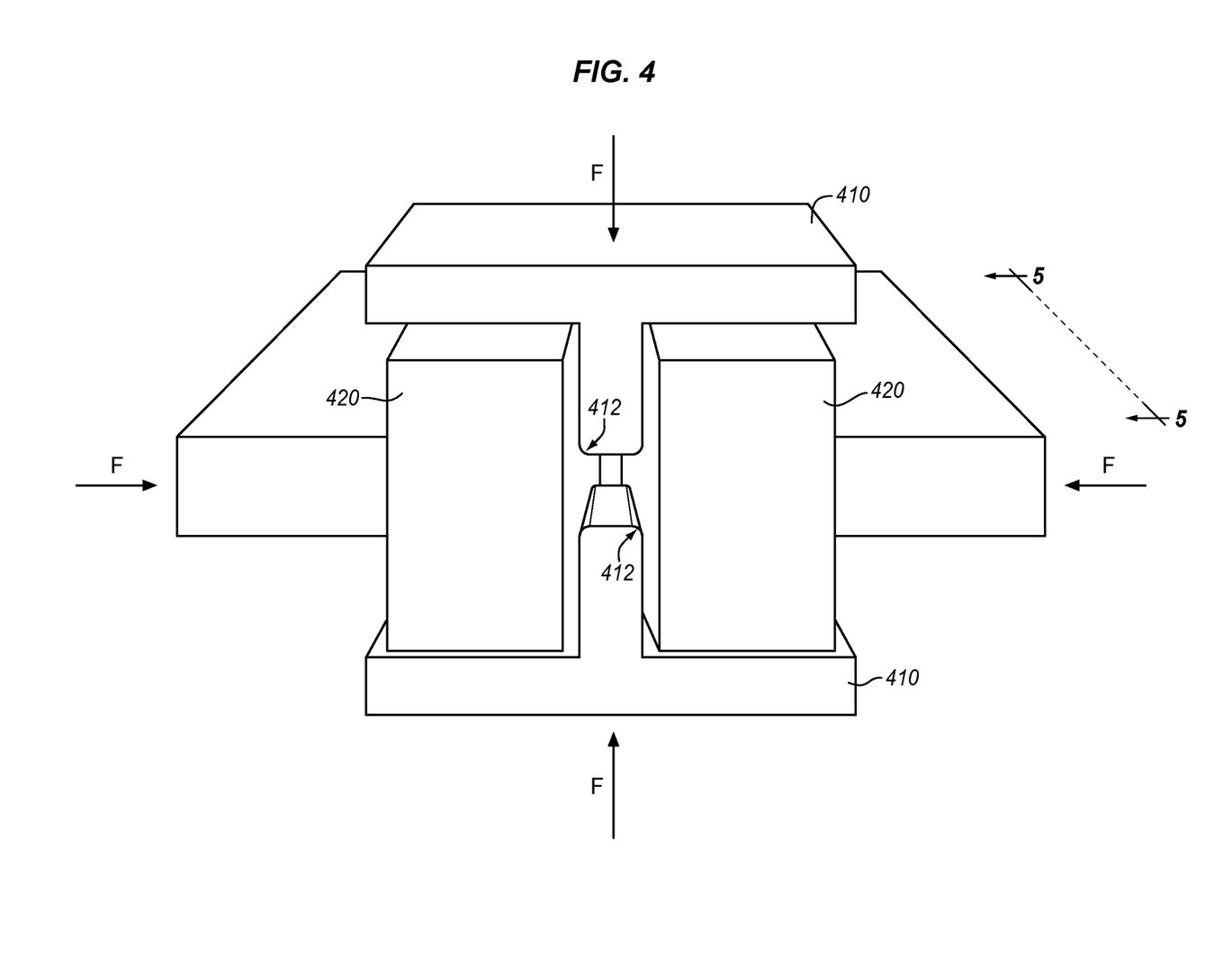
FIG. 4 is a front view of a dynamic die of a CCM machine that is not presently loaded with laminates and gap fillers in an exemplary embodiment.

FIG. 4 is a front view of a dynamic die 136 of a CCM machine that is not presently loaded with laminates and gap fillers in an exemplary embodiment. FIG. 4 corresponds with view arrows 4 of FIG. 1, and illustrates that dynamic dies 136 may include dies 420, and dies 410. In this embodiment, dies 410 exhibit a tool radius 412. Dies 410 and dies 420 apply force (F) that consolidates laminates 210 and laminates 220 into an "H" shaped cross section.

Figure 5:
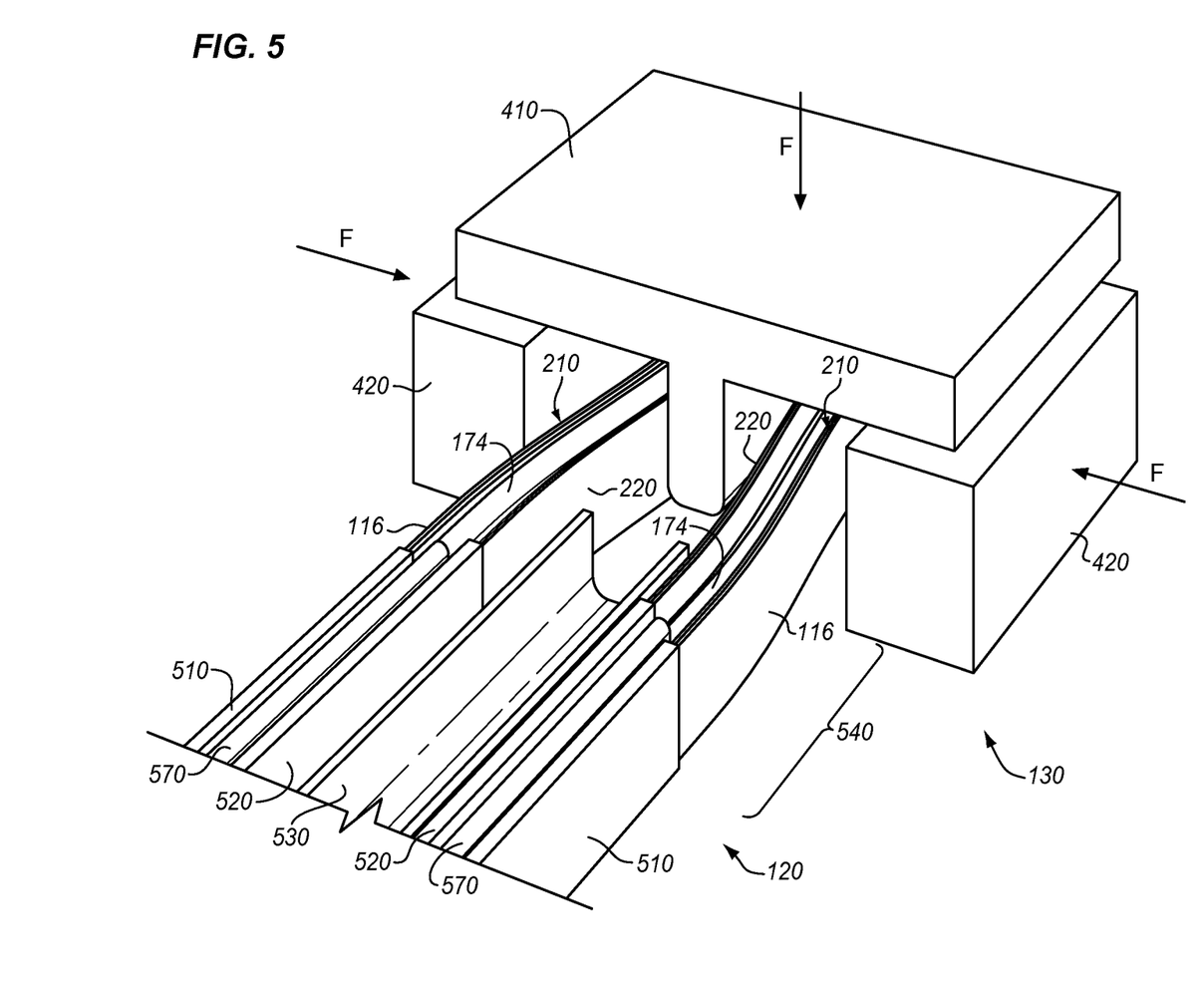
FIG. 5 is an isometric view of laminates and gap fillers entering a consolidator of a CCM machine in an exemplary embodiment.

FIG. 5 is an isometric view of laminates 210, laminates 220, and gap fillers 174 entering a consolidator 130 of CCM machine 100 in an exemplary embodiment. FIG. 5 corresponds with view arrows 5 of FIG. 4. FIG. 5 illustrates that laminates 210 leave forming tool 510 of preformer 120. Laminates 220 are arranged into "C" channels by interaction of forming tools 520 and C-channel shaped forming tool 530 of preformer 120. Furthermore, gap fillers 174 exit guides 570 of preformer 120. Laminates 210, laminates 220, gap fillers 174, and release foils 116 cross region 540 before entering consolidator 130. If gap fillers 174 merely comprised a single rolled up or spiraled layer of material, gap fillers 174 could potentially unroll within this region due to ambient elastic forces in region 540. This in turn would change the cross-sectional area of gap fillers 174, resulting in a distortion or bulge at the resulting composite part. Fortunately, gap fillers 174 have been heated above a glass transition temperature and pulled through fixed dies 194 prior to entry into preformer 120. This means that gap fillers 174 have no internal stresses which would cause them to deform during travel through region 540.

Figure 6:
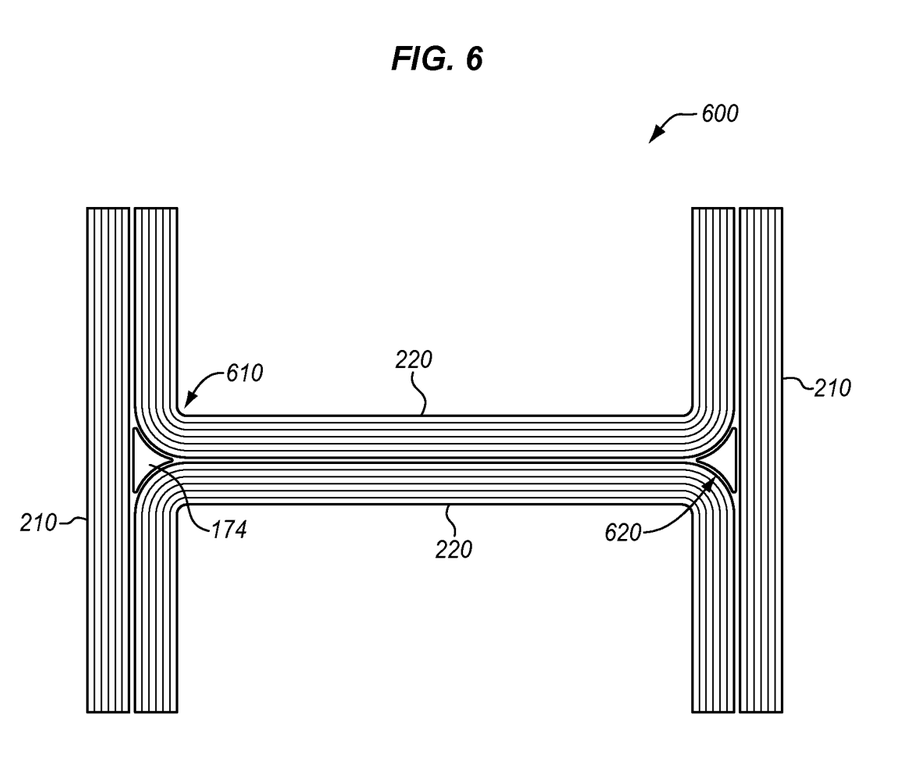
FIG. 6 is a front view of a cross section of a composite part that has been shaped by a CCM machine in an exemplary embodiment.
Figure 7:
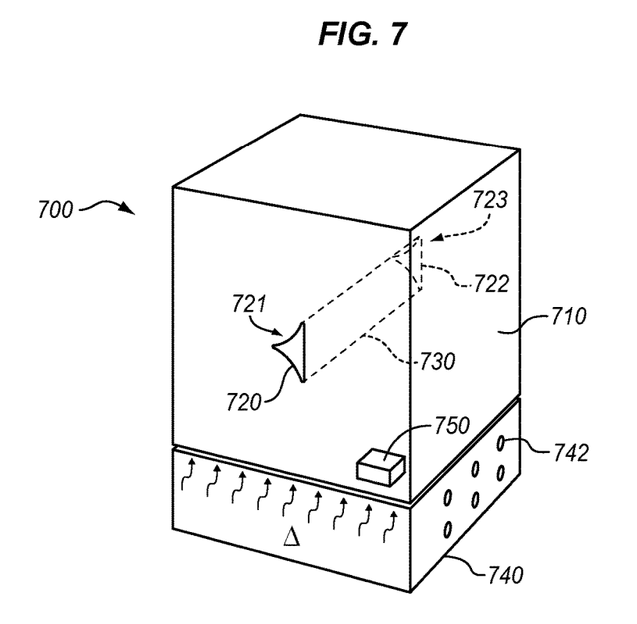
FIGS. 7-8 are diagrams illustrating a fixed die for shaping gap fillers of a CCM machine in an exemplary embodiment.
Figure 8:
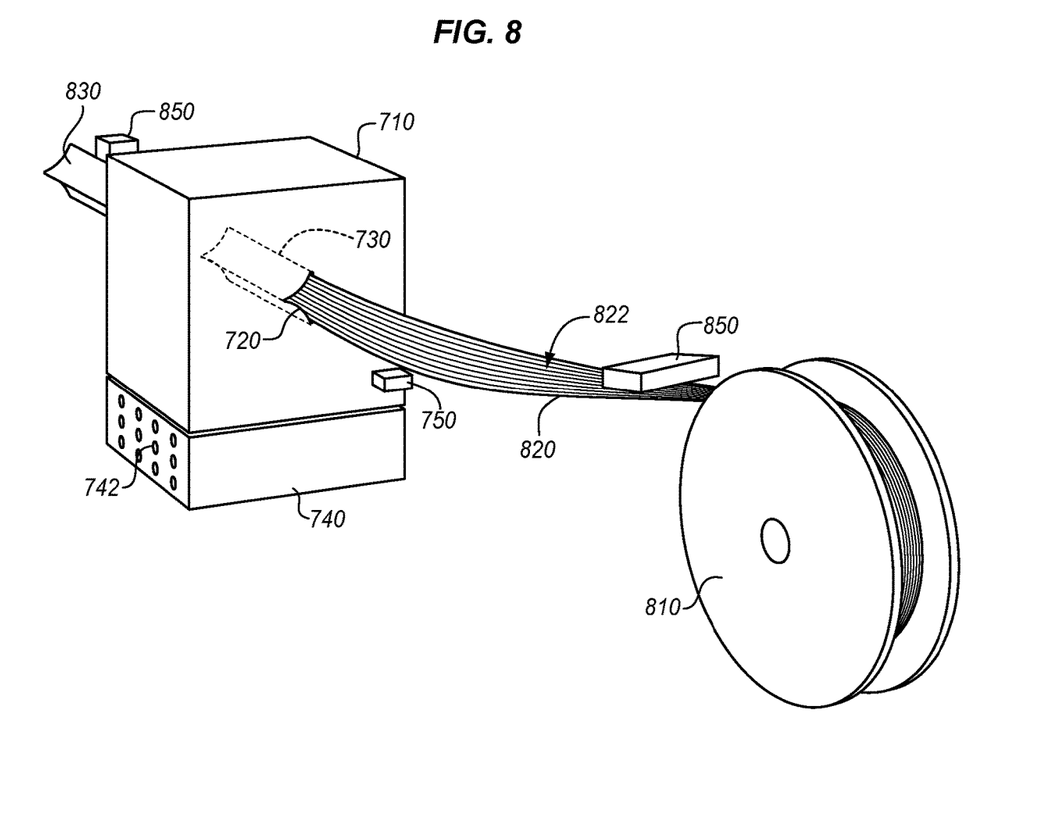

FIG. 6 is a slightly exploded front view of a cross section 600 of a composite part 138 that has been shaped by CCM machine 100 in an exemplary embodiment, and is not drawn to scale. FIG. 6 corresponds with view arrows 6 of FIG. 1, which illustrates a cross-section after consolidation has been completed. As shown in FIG. 6, laminates 220 and laminates 210 have been consolidated to form back-to-back C channels that define an "I." Meanwhile, gap fillers 174 have been consolidated into the "I" in order to account for a bend radius 620 that would otherwise result in gaps at the "I." Bend radius 610 is also illustrated, but does not form a gap because it is external to the "I." With a thorough discussion of components of preformer 120 and consolidator 130 provided above, fixed dies 194 will now be described which may be utilized to shape tape 172 into gap fillers 174 prior to entry into preformer 120. The tape 172 is pulled through these fixed dies 194 by drive mechanism 140 of CCM machine 100. Hence, drive mechanism 140 pulls laminates 210, laminates 220, and gap fillers 174 through preformer 120 and consolidator 130, as well as pulling gap fillers 174 through fixed dies 194. This means that pultrusion processes stop when laminates 210 and laminates 220 are not advancing through CCM machine 100. That is, pultrusion is not actively being performed while dies 136 are engaged, but rather is performed while dies 136 are withdrawn. FIGS. 7-8 are diagrams illustrating a fixed die 700 for shaping unidirectional fiber reinforced tape 820 into a gap filler 830 of CCM machine 100 in an exemplary embodiment. Both FIG. 7 and FIG. 8 correspond with view arrows 7 of FIG. 1, with the exception that gap fillers 174 have been omitted from FIG. 7.

FIG. 7 illustrates that fixed die 700 includes body 710. Body 710 includes channel 730 having an entrance 721 with a first cross section 720. Channel 730 also has an exit 723 having a second cross section 722, which corresponds with a (non-flat) cross section of a gap that would otherwise exist within the final "I" shaped composite part formed by CCM machine 100. FIG. 7 further illustrates that fixed die 700 is heated by heater 740, which in this embodiment comprises a resistive heater that contacts body 710 and has multiple heating elements 742 (e.g., electrically resistive heating elements) that heat body 710. A heat sensor 750 measures a temperature of die 700 (e.g., body 710). Contact between heater 740 and fixed die 700 heats body 710 to a desired temperature (e.g., 700° F.) at which thermoplastic within tape 820 melts, yet fibers 822 within tape 820 retain mechanical strength. The application of heat to fixed die 700 is represented by the symbol A. In further embodiments, fixed die 700 may be physically integral with heater 740, and heater 740 may comprise any suitable system for heating die 700 to the desired temperature. FIG. 8 illustrates that during CCM operations, tape 820 is unwound from spool 810, and drawn through channel 730 to match cross section 720. As gap filler 174 is pulled through channel 730, it is further condensed to conform with cross section 722 which is an exit of channel 730. This tapering of channel 730 helps to force tape into a desired cross section with a tapered transition. A completed gap filler 830 then exits fixed die 700. Hence, additional folding/overlapping of tape occurs during the forming and consolidation process of tape 820 into gap filler 830. One or more tension sensors 850 are also provided to ensure that tension stays within an expected range, and/or does not exceed a predefined value. Controller 196 may utilize input from these sensors to engage in a feedback control loop. A pulling mechanism downstream of die 700, such as drive mechanism 140, pulls the gap filler draws reinforced thermoplastic fiber material out of die 700. A feeding device upstream of the die (e.g., spool 810) feeds the reinforced thermoplastic material into entrance 721.

Figure 9:
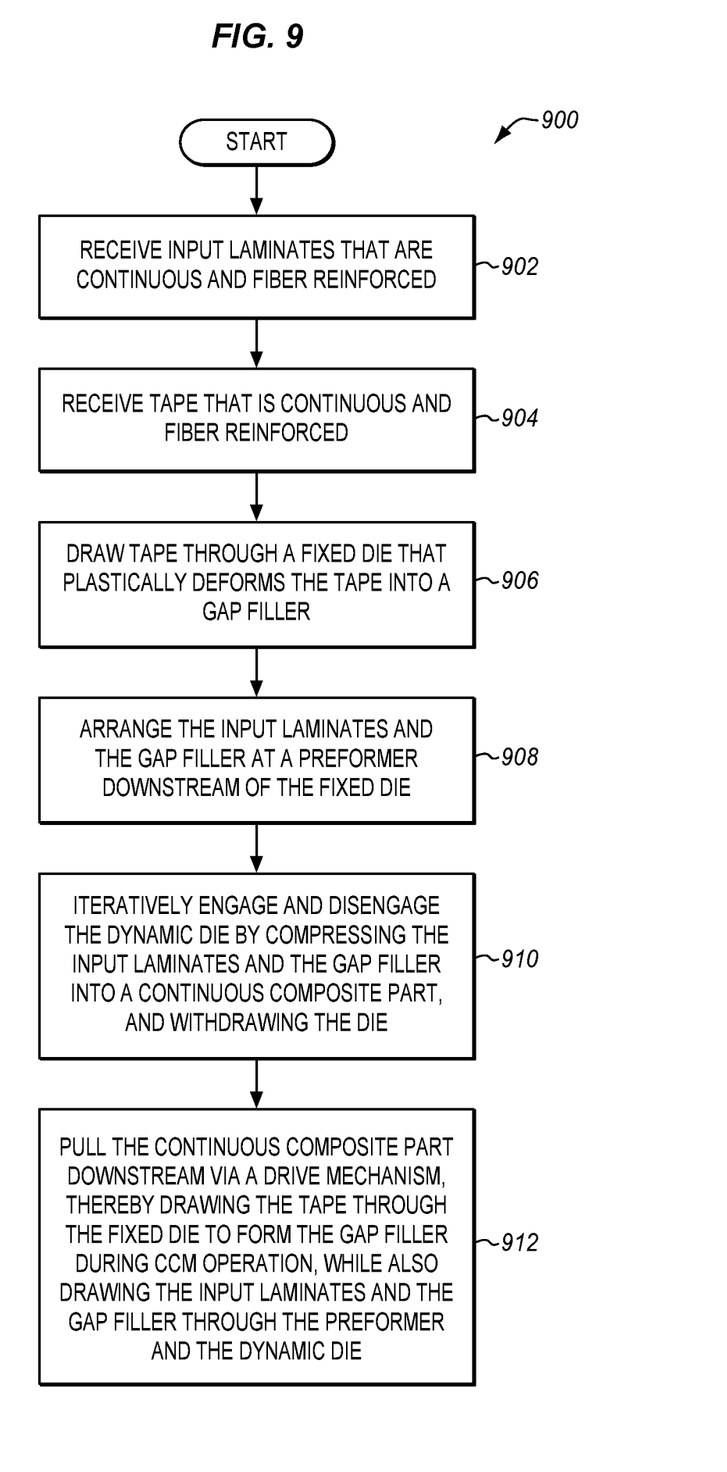
FIG. 9 is a flowchart illustrating a method for operating a CCM machine that includes fixed dies for gap fillers in an exemplary embodiment.

Illustrative details of the operation of CCM machine 100 will be further discussed with regard to FIG. 9. Assume, for this embodiment, that CCM machine 100 is loaded with laminates and gap fillers and is presently engaged in the fabrication of a continuous-length composite part.

FIG. 9 is a flowchart illustrating a method 900 for operating a CCM machine in an exemplary embodiment. The steps of method 900 are described with reference to CCM machine 100 of FIG. 1, but those skilled in the art will appreciate that method 900 may be performed in other systems. The steps of the flowcharts described herein are not all inclusive and may include other steps not shown. The steps described herein may also be performed in an alternative order.

CCM machine 100 receives laminates 210 and laminates 220 (step 902). Laminates 210 and laminates 220 are continuous and fiber reinforced. Furthermore, each layer of laminates 210 and laminates 220 may exhibit a different fiber orientation. CCM machine 100 also receives tape 172 which is continuous and reinforced by a unidirectional fiber. Tape 172, and the laminates, may be received via large spools (not shown).

Method 900 further includes drawing tape 172 through a fixed die 194, thereby plastically deforming tape 172 into a desired cross section 722 (step 906). Fixed die 194 is heated, and the combination of heat and pressure applied by drawing tape 172 through fixed die 194 causes thermoplastic material within tape 172 to melt as it is drawn through fixed die 194. Upon exiting fixed die 194, the thermoplastic material solidifies having a cross section defined by fixed die 194, and forms gap filler 174. Since gap filler 174 has been formed by heated pultrusion through fixed die 194 means that internal stresses within gap filler 174 are reset after gap filler 174 is formed. Hence, unlike gap fillers that are formed by rolling a single ply, gap filler 174 does not unwind or uncoil when it travels from preformer 120 to consolidator 130. A distance between fixed die 194 and preformer 120 may be selected specifically to ensure that gap filler 174 finishes solidifying before gap filler 170 reaches preformer 120.

One or more gap fillers 174, laminates 210, and laminates 220 are arranged at preformer 120, which is downstream of fixed dies 194 (step 908). During this arrangement, one or more laminates are folded into a desired shape, but are not yet consolidated onto other laminates.

Controller 196 operates dynamic dies 136 and actuators 128 in order to iteratively engage and disengage one or more dynamic dies 136 (step 910). Engaging the dynamic die 136 compresses laminates 210, laminates 220, and gap fillers 174. Heating of these components to a desired temperature (e.g., 700° F.) melts thermoplastic within these components. Hence, after cooling an integral continuous composite part 138 has been formed. Composite part 138 has cross section 600 (e.g., as illustrated at FIG. 6). Withdrawing dynamic dies 136 releases a brake on the advancement of final composite part 144, which in turn enables continuous composite part 138 to advance downstream by operation of drive mechanism 140.

During operation of CCM machine 100, controller 196 directs drive mechanism 140 to pull composite part 138 downstream (step 912). This draws gap fillers 174, laminates 210, and laminates 220 through preformer 120 and consolidator 130 (including dynamic dies 136). The action also draws tape 172 through fixed die 194. Drive mechanism 140 may be stopped while dynamic dies 136 are engaged, and started while dynamic dies 136 are withdrawn. Hence, the same drive mechanism 140 that performs CCM operations performs pultrusion in order to form gap fillers used in those same CCM operations. In short, drive mechanism 140 draws laminates 210, laminates 220, and gap fillers 174 through preformer 120 and dynamic die 136, while also drawing tape 172 through fixed die 194. These processes are controlled by controller 196.

Utilizing method 900 provides a substantial advantage in that it blends pultrusion techniques for gap fillers seamlessly into a CCM machine. It prevents gap fillers 174 from unwinding or uncoiling as they transition from preformer 120 to consolidator 130, and furthermore enable a drive mechanism 140 at CCM machine 100 to be utilized for multiple purposes, increasing efficiency.

Examples

In the following examples, additional processes, systems, and methods are described in the context of a CCM machine for fabricating a continuous thermoplastic composite part.

Figure 10:
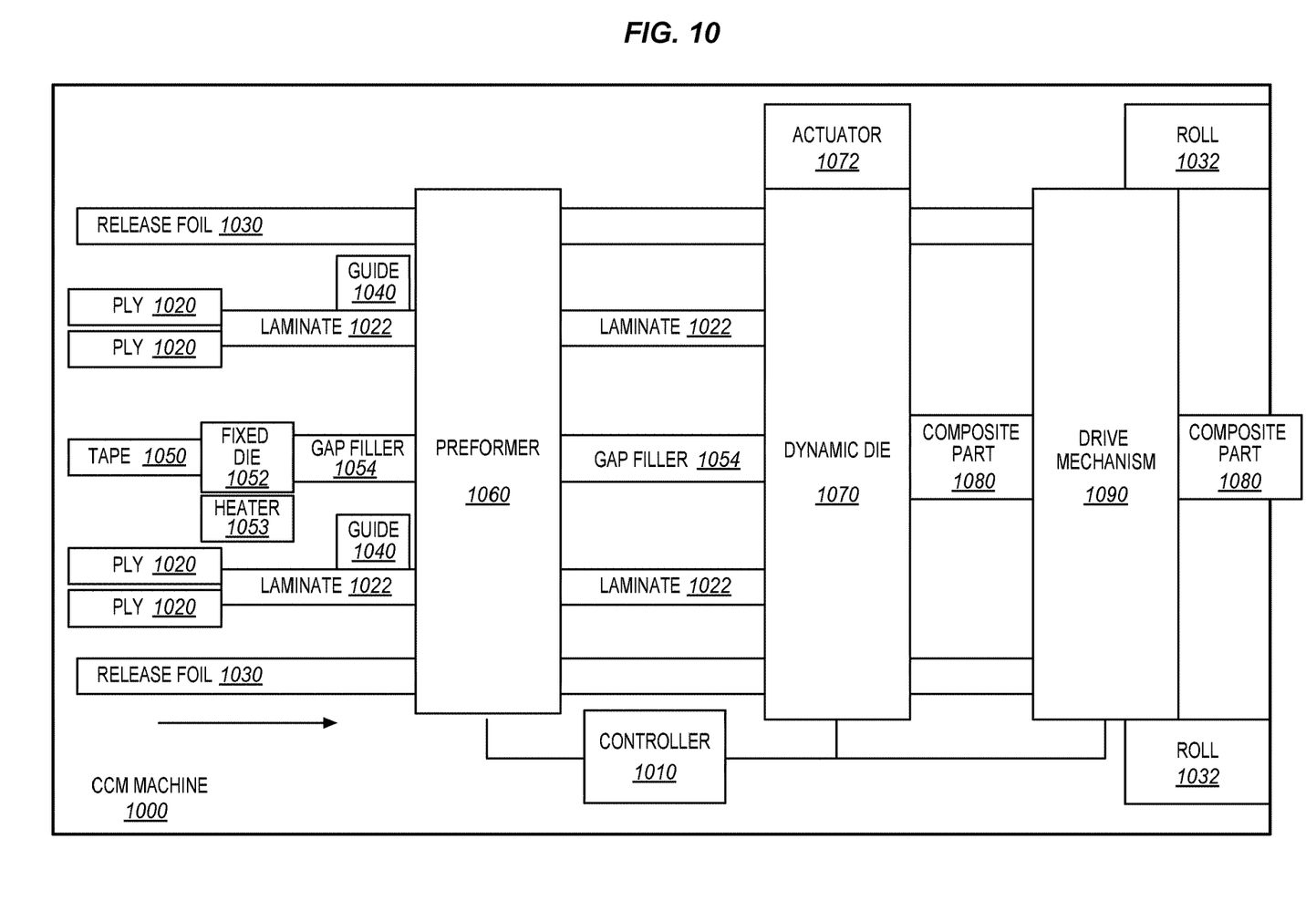
FIG. 10 is a block diagram of a CCM machine in an exemplary embodiment.

FIG. 10 is a block diagram of a CCM machine 1000 in an exemplary embodiment. In this example, controller 1010 (e.g., a processor implementing instructions) manages the operations of components within CCM machine 1000, such as preformer 1060, dynamic die 1070, and drive mechanism 1090. Incoming plies 1020 are combined to form laminates 1022, which are directed by guides 1040 into preformer 1060. Release foil 1030 is also directed into preformer 1060. Tape 1050 is drawn through fixed die 1052, which is heated by heater 1053. This results in gap filler 1054 having a desired cross section. Gap filler 1054 also enters preformer 1060, which arranges these various input to approximate a cross section for the resulting composite part 1080. Laminates 1022, release foils 1030, and gap filler 1054 enter dynamic die 1070, which is driven by actuator 1072 to consolidate these components at an elevated temperature wherein thermoplastic within these components melts. Upon cooling and solidifying, composite part 1080 is formed. Drive mechanism 1090 draws composite part 1080 and release foil 1030 forward while dynamic die 1070 is not engaged, in order to enable continued fabrication of a length of composite part 1080. Release foil 1030 is then stored on roll 1032.

Figure 11:
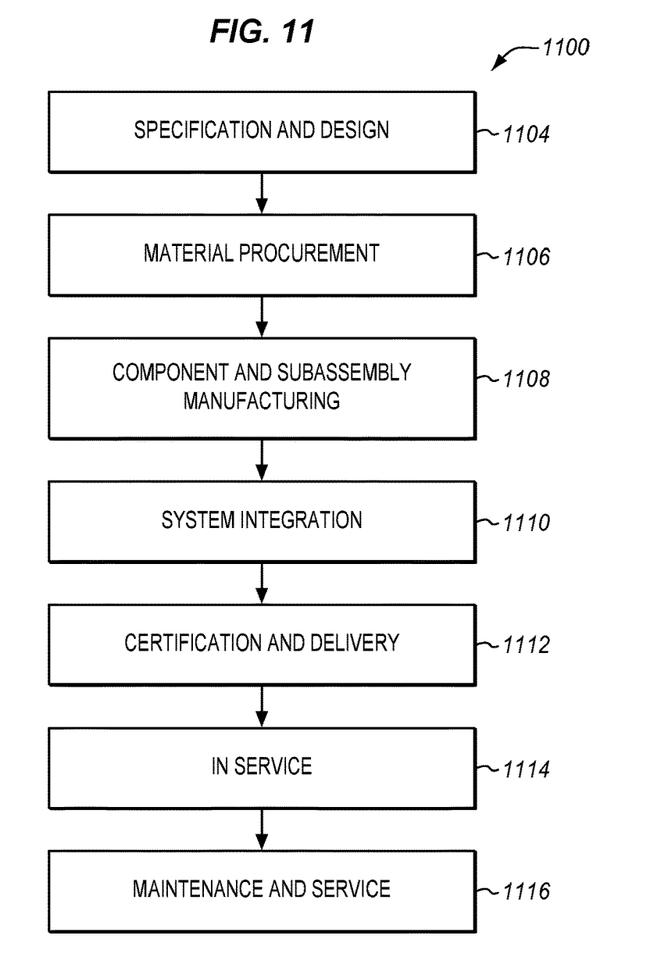
FIG. 11 is a flow diagram of aircraft production and service methodology in an exemplary embodiment.
Figure 12:
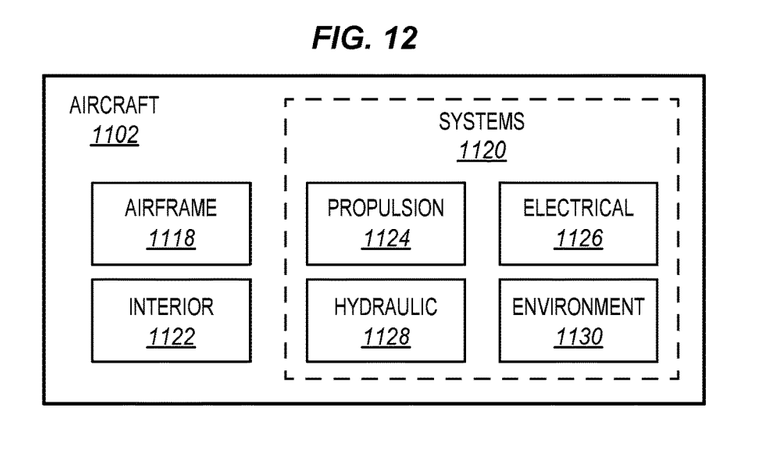
FIG. 12 is a block diagram of an aircraft in an exemplary embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on). Apparatus and methods embodied herein may be employed during any one or more suitable stages of the production and service method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion 1124, electrical 1126, hydraulic 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, composite part 138 comprises a portion of airframe 1118, such as a stringer, and is manufactured during component and subassembly manufacturing 1108. Composite part 138 may then be assembled into an aircraft in system integration 1110, and then be utilized in service 1114 until wear renders composite part 138 unusable. Then, in maintenance and service 1116, composite part 138 may be discarded and replaced with a newly manufactured composite part 138. Inventive components and methods may be utilized throughout component and subassembly manufacturing 1108 in order to manufacture new composite parts 138.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
receiving flat unidirectional tape that is continuous and fiber-reinforced;
drawing the tape through a single fixed die that heats and plastically deforms the tape into a gap filler having a non-flat cross section, wherein the tape is drawn through a tapering channel of the die that includes an exit having a smaller cross section than an entrance of the channel; and
operating a Continuous Compression Molding (CCM) machine that iteratively engages and disengages a dynamic die, by:
compressing laminates and the gap filler into a continuous composite part via the dynamic die while pausing the drawing;
withdrawing the dynamic die, resulting in the continuous composite part; and
advancing the composite part downstream as the drawing is resumed after the dynamic die is withdrawn.

2. The method of claim 1 further comprising:
receiving the laminates;
arranging the laminates and the gap filler at a preformer downstream of the fixed die; and
pulling the continuous composite part downstream, thereby drawing the tape through the fixed die to form the gap filler during CCM operation, while also drawing the laminates and the gap filler through the preformer and dynamic die.

3. The method of claim 2 wherein:
the gap filler is sandwiched between the laminates.

4. The method of claim 2 further comprising:
coordinating action of a drive mechanism performing the pulling, and the dynamic die during CCM operation, based on a feedback control loop utilizing input from one or more tension sensors that measure tension at the tape.

5. The method of claim 4 wherein:
the drive mechanism starts and stops the pulling based on whether the dynamic die is engaged or disengaged.

6. The method of claim 1 further comprising:
operating a heater that heats the fixed die to a glass transition temperature of a thermoplastic material within the tape.

7. The method of claim 6 wherein:
operating the heater comprises applying a current to a resistive heating element of the heater.

8. The method of claim 1 wherein:
the tape comprises Carbon Fiber Reinforced Polymer (CFRP).

9. The method of claim 1 wherein:
the gap filler comprises a thermoplastic component.

10. The method of claim 1 further comprising:
controlling an amount of drawing force in response to input from at least one tension sensor.

11. The method of claim 1 wherein: withdrawing the dynamic die releases a brake on the advancement of the continuous composite part.

12. The method of claim 1 wherein:
the tape comprises thermoplastic and fibers.

13. The method of claim 1 further comprising:
combining plies to form the laminates.

14. The method of claim 1 further comprising:
pausing the drawing while operating the dynamic die, which is subdivided into different temperature zones.

15. The method of claim 1 further comprising:
operating guides to direct the tape.

16. The method of claim 1 wherein:
drawing the tape through the fixed die includes melting thermoplastic material within the tape.

17. The method of claim 1 wherein:
drawing the tape draws a release foil.

18. The method of claim 1 further comprising:
operating a controller that selectively initiates and halts the drawing.

19. The method of claim 1 wherein:
the gap filler is integrated into a "C" shaped cross section.

20. The method of claim 1 wherein:
the gap filler is integrated into an "I" shaped cross section.

* * * * *